July 31, 1962 R. J. WENTE 3,047,317
ADJUSTABLE CONNECTION
Filed Nov. 12, 1959

INVENTOR.
Robert J. Wente
BY
Paul Fitzpatrick
ATTORNEY

United States Patent Office 3,047,317
Patented July 31, 1962

3,047,317
ADJUSTABLE CONNECTION
Robert J. Wente, Indianapolis, Ind., assignor to General Motors Corporation, Detroit, Mich., a corporation of Delaware
Filed Nov. 12, 1959, Ser. No. 852,512
4 Claims. (Cl. 287—52.02)

My invention relates to angularly adjustable connections between shafts and members mounted thereon such, for example, as a control arm which is adjustable connected to a shaft. The purpose of the invention is to provide a strong, rigid connection between a shaft and a control arm or other body mounted on the shaft, which connection is readily infinitesimally adjusted to vary the angular relation of the arm to the shaft.

A connection of the character outlined above is useful in many applications, a preferred one being in power plant controls where it is necessary to align or adjust control linkages to cause the power plant to operate on the desired schedule. Such control linkages are disclosed in U.S. Patent 2,860,712 of McDowall et al. My invention serves the same general function as the mountings of arms on shafts shown in Bendix U.S. Patent 1,663,290 and Gaubatz U.S. Patent 2,627,188. However, it provides a connection which is more accurately and quickly adjustable and stronger than connections of the sort shown in those patents. The nature of the invention and the advantages thereof will be clearly apparent to those skilled in the art from the succeeding detailed description of the preferred embodiment of the invention and the accompanying drawings thereof.

Figure 1:
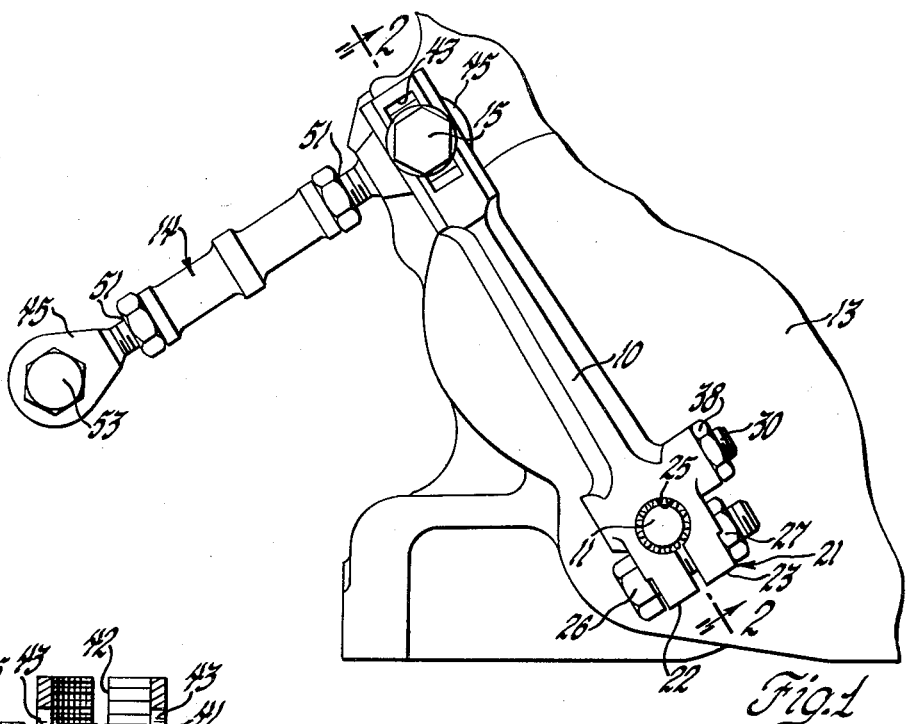
FIGURE 1 is a view of a portion of a power plant control linkage.

Referring first to FIGURE 1, my invention is embodied in the connection between a control arm 10 and a shaft 11 to which the control arm is adjustably fixed. The shaft 11 may be mounted in any suitable manner in a power plant control or other device 13. The structure and operation of device 13 are entirely immaterial to the invention. A link 14 pivoted by a bolt 15 to the outer end of arm 10 may be connected to any further mechanism which is moved to rotate shaft 11 or is moved by rotation of shaft 11.

Figure 2:
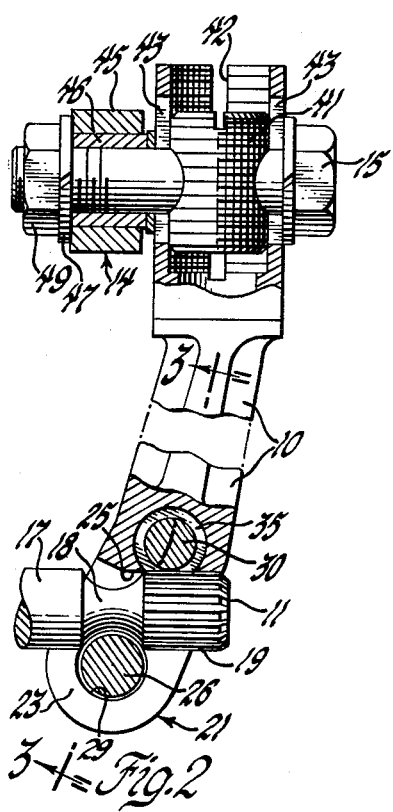
FIGURE 2 is a view of the same with parts broken away and in section along the plane indicated by the line 2—2 in FIGURE 1.
Figure 3:
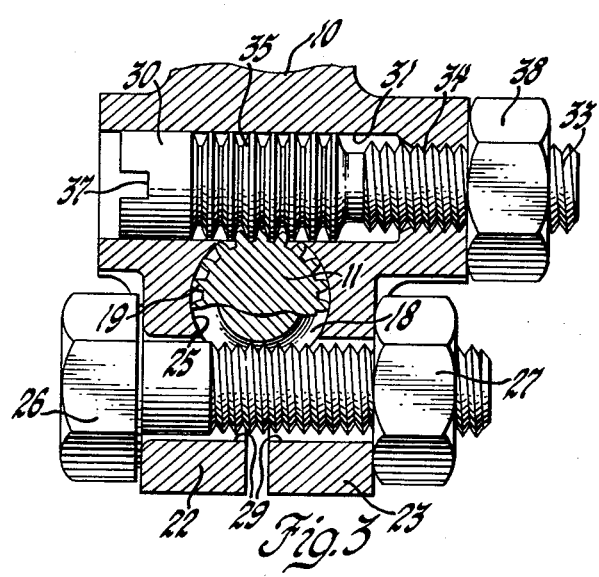
FIGURE 3 is a fragmentary sectional view taken substantially on the plane indicated by the line 3—3 in FIGURE 2.

Referring additionally to FIGURES 2 and 3, the shaft 11 comprises a cylindrical main shaft portion 17 suitably journalled, by means not illustrated, in the housing 13, a reduced portion or neck 18, and a toothed or splined portion 19 which constitutes a gear integral with the shaft. The arm 10 has a bifurcated hub or inner end portion 21 comprising furcations 22 and 23 extending from a bore 25 which is piloted on the shaft 11.

Compressing means are provided to draw the furcations 22 and 23 together and thus tighten the bore 25 on the shaft so that the arm is rigid on the shaft. The compressing means as illustrated comprises a screw or bolt 26 and a nut 27 threaded thereon. The screw passes through aligned holes 29 in the furcations 22 and 23, generally tangent to shaft 11. Tightening the nut on the bolt takes up the clearance between the shaft and the bore 25 in the arm and tightly clamps the arm to the shaft. The neck 18 of the shaft provides clearance for the bolt 26. This is, of course, an optional feature, since this recess could be omitted and the bolt 26 could be spaced farther from the axis of the shaft. The presence of the neck 18 has an advantage in addition to promoting compactness of the structure; it causes the screw 26 to act as a retaining member to prevent arm 10 from sliding off the end of shaft 11 when the compressing means is loosened.

A means for setting the adjustment of arm 10 with respect to the shaft comprises an adjusting screw 30 disposed in a transverse bore 31 parallel to the bores 29 and tangent to shaft 11. Screw 30 included a threaded portion 33 engaged in threads 34 in the arm. It also includes a cylindrical rack portion 35, the teeth of which mesh with the gear in any position of rotation of screw 30 about its axis. Screw 30 includes a head provided with a screwdriver slot 37 or equivalent means to receive a tool to turn the screw.

A jam nut 38 threaded on the screw may be tightened after the adjustment is completed to lock screw 30 against rotation and preserve the adjustment. It will be noted that the rack 35 comprises a number of teeth sufficient to provide considerable angular adjustment of the arm 10 about the shaft 11.

The operation of the structure so far described will presumably be apparent, but may be described briefly. The arm 10 is slid onto the shaft and the bolt 26 is put in place with the nut 27 loose so that the arm may rotate relative to the shaft. The screw 30 is then introduced and threaded into the portion 34 of the arm. As the screw proceeds into the thread 34, the rack 35 will engage the gear 19, and further turning of screw 30 will move arm 11 counterclockwise about the shaft as illustrated in FIGURES 1 and 3. The position of the arm at the initial engagement of the rack with the gear should be generally related to the ultimate position so that the ultimate position lies within the range of adjustment of the arm.

During the lining up of the control linkage, the proper position of the arm 10 with respect to shaft 11 is determined by whatever alignment procedures are suitable for the particular linkage, and the screw 30 is turned until the proper relation is established. The nut 38 is then installed and tightened to preserve this adjustment, and the nut 27 is tightened to compress the bifurcated end of the arm to fit the shaft closely and eliminate any wobble or shake of the arm with respect to the shaft. It will be noted that the furcations 22 and 23 are symmetrical, and therefore the clamping operation does not upset in any way the alignment of the arm with the shaft established by the screw 30. This is an important advantage of the invention, since it has been found in practice that the use of a simple tangent screw for both adjustment and clamping, as in the structure illustrated in the Gaubatz patent referred to above, presents the practical difficulty that the clamping operation produces a slight deviation from the adjustment previously made.

The connection according to my invention presents a further advantage in that there is both a direct interlocking connection between the shaft and arm through gear 19, rack 35, and threads 33, 34 and a tight clamped connection provided by the compressing screw 26. Accidental loosening of either nut 38 or nut 27 would not allow a serious misalignment or loosening of the control arm.

FIGURES 1 and 2 also illustrate, by way of showing the environment of the invention, a connection between the outer end of arm 10 and the link 14. This connection is the same as that illustrated in FIGURE 4 of the Gaubatz patent referred to above, but may be described briefly. It provides means for adjusting the effective length of arm 10. The bolt 15 previously referred to passes through a threaded plug 41 threaded into the outer end of the arm, which is divided by slots 42. Bolt 15 also passes through radial slots 43 in the arm. An eye 45 on link 14 is journalled on a bushing 46 on the bolt 15, the arm and bushing being retained by a washer 47 and a nut 49. The bolt 15 may be inserted in the screw 41 in different positions of the screw to vary the effective length of the arm. The arm 14 may also include conventional adjustable threaded connections 51 between the arm and the eyes 45 at each end of it so that the length of the link may be adjusted in rigging the controls. A bolt 53 may connect the other end of link 14 to a second arm such as arm 10 just described or to any other movable member.

It will be apparent to those skilled in the art from the foregoing description that my invention provides a particularly accurate, convenient, and rugged adjustable connection between a shaft and a control arm or other part adjustably mounted on the shaft.

The detailed description of the preferred embodiment of the invention for the purpose of explaining the principles thereof is not to be considered as limiting or restricting the invention, since many modifications may be made by the exercise of skill in the art within the scope of the invention.

I claim:

1. The combination of a shaft; a member fixed thereon so as to be angularly adjustable relative the shaft, the member having a split portion embracing the shaft and piloted thereon; compressing means engaging the split portion operable to clamp the member to the shaft; and a rotatable adjusting screw having a portion threadedly engaged with the member and a toothed portion; the shaft having a gear portion meshing with the toothed portion so that rotation of the screw angularly adjusts the member with respect to the shaft; the adjusting screw being disposed generally tangent to the shaft on one side thereof, and the compressing means comprising a tension member generally tangent to the shaft at the other side thereof.

2. The combination of a shaft; a member fixed thereon so as to be angularly adjustable relative to the shaft, the member having a split portion embracing the shaft and piloted thereon; compressing means engaging the split portion operable to clamp the members to the shaft; and a rotatable adjusting screw having a portion threadedly engaged with the member and a toothed portion; the shaft having a gear portion meshing with the toothed portion so that rotation of the screw angularly adjusts the member with respect to the shaft; the adjusting screw being disposed generally tangent to the shaft on one side thereof, and the compressing means comprising a tension member generally tangent to the shaft at the other side thereof, the tension member being interengaged with the shaft so as to locate the first mentioned member axially of the shaft.

3. The combination of a shaft; a member fixed thereon so as to be angularly adjustable relative to the shaft, the member having a split portion embracing the shaft and piloted thereon; compressing means engaging the split portion operable to clamp the member to the shaft; and a rotatable adjusting screw having a portion threadedly engaged with the member and a cylindrical rack portion; the shaft having a gear portion meshing with the rack portion so that rotation of the screw angularly adjusts the member with respect to the shaft.

4. The combination of a shaft; a member fixed thereon so as to be angularly adjustable relative to the shaft, the member having a split portion embracing the shaft and piloted thereon; compressing means engaging the split portion operable to clamp the member to the shaft; and a rotatable adjusting screw having a portion threadedly engaged with the member and a cylindrical rack portion; the shaft having a gear portion meshing with the rack portion so that rotation of the screw angularly adjusts the member with respect to the shaft; the adjusting screw being disposed generally tangent to the shaft on one side thereof, and the compressing means comprising a threaded member generally tangent to the shaft at the other side thereof.

References Cited in the file of this patent

UNITED STATES PATENTS

| | | |
|---|---|---|
| 130,878 | Stiles | Aug. 27, 1872 |
| 502,620 | Fisher | Aug. 1, 1893 |
| 1,421,408 | Collyer | July 4, 1922 |
| 1,623,262 | Nelson | Apr. 5, 1927 |
| 1,663,290 | Bendix | Mar. 20, 1928 |
| 1,668,274 | Guillery | May 1, 1928 |
| 2,070,639 | Anton | Feb. 16, 1937 |
| 2,627,188 | Gaubatz | Feb. 3, 1953 |
| 2,860,712 | McDowall et al. | Nov. 18, 1958 |

FOREIGN PATENTS

| | | |
|---|---|---|
| 27,957 of 1897 | Great Britain | July 30, 1898 |
| 6,557 | France (Addition to 357,736) | Oct. 15, 1906 |